United States Patent Office 3,590,037
Patented June 29, 1971

3,590,037
N-PYRIDYL-FORMIMINO ETHERS
Pal Benko, 7 Parcsay Vilmos utca; Laszlo Pallos, 8a Ugocsa utca; and Ferenc Ordogh, 25–27 Ozike utca, all of Budapest XII, Hungary; and Julianna Rosdy, nee Kiss, 5 Muk S. utca, Budapest XIII, Hungary
No Drawing. Continuation-in-part of application Ser. No. 717,013, Mar. 28, 1968. This application Apr. 21, 1970, Ser. No. 30,591
Int. Cl. C07d 31/42
U.S. Cl. 260—240                                   1 Claim

ABSTRACT OF THE DISCLOSURE

New N-pyridyl-formimino ethers of the formula

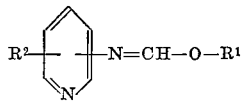

wherein $R^1$ represents a saturated straight or branched chain alkyl group of 7 to 16 carbon atoms, a cycloalkyl group of 5 to 6 carbon atoms, a benzyl or phenylethyl group or a dimethylaminoethyl or diethylaminoethyl radical and $R^2$ represents hydrogen, halogen, nitro or lower alkyl. The new compounds are useful as anthelmintics and cercaricides.

---

The present application is a continuation-in-part of our copending application Ser. No. 717,013, filed Mar. 28, 1968, now abandoned.

The invention relates to new N-pyridyl-formimino ethers of valuable therapeutic effects, as well as to a process for the preparation of such N-pyridyl-formimino. ethers.

The new compounds of the present invention can be characterized by the formula

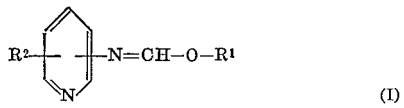

wherein $R^1$ represents a saturated straight or branched chain alkyl group of 7 to 16 carbon atoms, a cycloalkyl group of 5 to 6 carbon atoms, a benzyl or phenylethyl group or a dimethylaminoethyl or diethylaminoethyl radical and $R^2$ represents hydrogen, halogen, nitro or lower alkyl.

The N-pyridyl-formimino ethers of Formula I can be prepared according to the present invention by reacting a formimino-alkyl ether of the formula

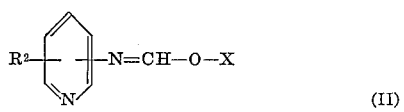

wherein X represents an alkyl group of 1 to 4 carbon atoms, and $R^2$ has the same meaning as above, with an alcohol of the formula

$$HO—R^1 \quad (III)$$

wherein R has the same meaning as above. This reaction can be performed preferably in the presence of an organic solvent, and of an alkali metal or an alkali alkoxide. The alcohol of Formula III may be used in an equimolecular amount or, more preferably, in excess; the reaction proceeds in general readily at the reflux temperature of the reaction mixture. The obtained N-pyridyl-formimino ethers of Formula I may be converted in known manner, if desired, into quaternary ammonium derivatives.

The new compounds of the present invention show a potent and selective anthelmintic action against well developed worms of the species Tubifex rivularium. The anthelmintic effects of the new compounds are stronger than those of the anthelmintic agents known and used hitherto. The new compounds also show a cercaricidal activity, which is unusual for anthelmintics.

The invention is illustrated in more detail by the following examples.

EXAMPLE 1

The mixture of 12.5 g. (0.0832 mol.) of N-(4-pyridyl)-formimino-ethyl ether and 21.6 g. (0.2 mol.) benzyl alcohol was heated in the presence of 0.05 g. of metallic sodium for two hours at 100–120° C. The ethanol formed during the reaction was distilled off continuously; the end of the reaction was shown by collecting of the theoretical amount of ethanol in the distillate. The distillation residue was then fractionated; the obtained N-(4-pyridyl)-formimino-benzyl ether boils under 0.1 mm. Hg at 70–78° C.

EXAMPLE 2

25 g. (0.1664 mol.) of N-(4-pyridyl)-formimino-ethyl ether was mixed with 24.42 g. (0.2 mol.) of β-phenyl-ethyl alcohol, 0.05 g. of metallic sodium was added to the mixture and it was heated for 3 hours at 110–140° C. The reaction product was then subjected to fractionated distillation; the obtained N-(4-pyridyl)-formimino-(β-phenyl-ethyl) ether boils under 0.05 mm. Hg at 138–140° C. The following additional compounds have also been prepared by the method of the above example:

N-(2-pyridyl)-formimino-octylether—B.P.$_{0.2}$=150–151° C.
N-(3-pyridyl)-formimino-octylether—B.P.$_{0.5}$=162–163° C.
N-(4-pyridyl)-formimino-octylether—B.P.$_{0.1}$=185–187° C.
N-(4-methyl-2-pyridyl)-formimino-octylether—
B.P.$_{0.05}$=195–196° C.

EXAMPLE 3

The mixture of 150.18 g. (1 mol.) of N-(3-pyridyl)-formimino-ethyl ether and 242.4 g. (1 mol.) of cetyl alcohol was dissolved in 500 ml. of benzene. The solution was then heated to the boiling point and the formed ethanol was distilled off as an azeotropic mixture with benzene. At the end of the reaction the benzene was distilled off too, and the residue was subjected to fractionated distillation. The obtained N-(3-pyridyl)-formimino cetyl ether boils under 0.05 mm. Hg at 193–195° C. The following additional compounds have also been prepared by the method of the above example:

N-(2-pyridyl)-formimino-n-decylether—B.P.$_{0.2}$=149° C.
N-(4-pyridyl)formimino-n-decylether—B.P.$_{0.4}$=152° C.
N-(3-pyridyl)-formimino-dodecylether—B.P.$_{0.15}$=192° C.

EXAMPLE 4

150.18 g. (1 mol.) of N-(3-pyridyl)-formimino ethyl ether and 300.46 g. (3 mol.) of cyclohexanol were reacted in the presence of 0.1 g. of metallic sodium as described in Example 1. The obtained N-(3-pyridyl)-formimino cyclohexyl ether boils under 0.2 mm. Hg at 123–124° C. pyridyl)-formimino β-diethylaminoethyl ether boils under 0.2 mm. Hg at 170–182° C.

EXAMPLE 5

15 g. (0.1 mol.) of N-(3-pyridyl)-formimino ethyl ether and 47.4 g. (0.3 mol.) of n-decyl alcohol were reacted for half an hour in the presence of 0.05 g. of metallic sodium, as described in Example 1. The obtained N-(3-pyridyl)-formimino n-decyl ether boils under 0.2 mm. Hg at 156–158° C. The following additional compounds have also been prepared by the method of the above example:

N-(2-pyridyl)-formimino-cetylether—M.P. 54–55.5° C.
N-(4-pyridyl)-formimino - cetylether—B.P. $_{0.4}$=200–203° C.
N-(5-chloro-2-pyridyl)-formimino - cetylether—M.P. 59–61° C.

EXAMPLE 6

The mixture of 150.18 g. (1 mol.) of N-(2-pyridyl)-formimino ethyl ether and 122.16 g. (1 mol.) of β-phenyl ethyl alcohol in 600 ml. of toluene was heated at 110–140° C. for three hours in the presence of 0.05 g. of metallic sodium. The product was isolated as described in Example 2; the obtained N-(2-pyridyl)-formimino β-phenyl-ethyl ether boils under 0.05 mm. Hg at 135° C.

EXAMPLE 7

The mixture of 15.0 g. (0.1 mol.) of N-(2-pyridyl)-formimino ethyl ether, 21.6 g. (0.2 mol.) of benzyl alcohol and 0.05 g. of metallic sodium was reacted as described in Example 2. The obtained N-(2-pyridyl)-formimino benzyl ether boils under 0.5 mm. Hg at 148° C.

EXAMPLE 8

16.42 g. (0.1 mol.) of N-(4-methyl-2-pyridyl)-formimino ethyl ether were reacted in the presence of 0.1 g. of metallic sodium with 60 g. of β-diethylamino ethanol as described in Example 2. The obtained N-(4-methyl-2-

EXAMPLE 9

The mixture of 18.46 g. (0.1 mol.) of N-(5-chloro-2-pyridyl)-formimino ethyl ether, 11.62 g. (0.1 mol.) of heptan-4-ol and 0.1 g. of metallic sodium was reacted as described in Example 2. The obtained N-(5-chloro-2-pyridyl)-formimino 4′-heptyl ether boils under 0.05 mm. Hg at 162–182° C. The following additional compounds have also been prepared by the method of the above example:

N-(3-pyridyl)-formimino-β-phenylethyl-ether—B.P. $_{0.05}$=138–139° C.
N-(5-nitro-2-pyridyl)-formimino-benzyl-ether—B.P. $_{0.1}$=145–146° C.

The new compounds show significant pharmacological advantages over those of the lower alkyl analogues of Hungarian Pat. No. 153,520 issued Mar. 22, 1967. Table I shows the minimal inhibiting concentrations in mg. percent against *Enchytraeus albidus* (E), *Tubifex rivulorum* (T) and *Schistosoma mansoni cercaria* (C) of the new compounds and, for comparison, those of analogous $C_{1-4}$ alkyl compounds disclosed in the Hungarian patent; the significantly higher activity of the new compounds can be seen from this table.

TABLE I.—MINIMAL INHIBITING CONCENTRATIONS IN MG. PERCENT AGAINST *ENCHYTRAEUS ALBIDUS* (E), *TUBIFEX RIVULORUM* (T) AND *SCHISTOSOMA MANSONI CERCARIA* (C)

|  | E | T | C |
|---|---|---|---|
| N-(4-pyridyl)-formimino-octylether | 1.7–3.5 | 15.5 | 0.8 |
| N-(4-pyridyl)-formimino-dodecylether | 15.5 | 3.5–7.5 | 0.8–1.7 |
| N-(4-pyridyl)-formimino-cyclohexylether | 3.5 | 1.7–3.5 | 1.7 |
| N-(4-pyridyl)-formimino-cyclopentyl-ether | 1.7–3.5 | 1.7 | 3.5 |
| N-(3-pyridyl)-formimino-octylether | 1.7–0.8 | 15.5 | 0.4–0.8 |
| N-(3-pyridyl)-fomimino-dodecylether | 1.7 | 0.8 | 0.4–0.1 |
| N-(2-pyridyl)-formimino-octylether | 1.7–0.8 | 3.5 | 0.31–0.16 |
| N-(2-pyridyl)-formimino-dodecylether | 3.5–7.5 | 7.5 | 3.5 |
| Previously described $C_{1-4}$ alkyl ethers: |  |  |  |
| N-(2-pyridyl)-formimino-methyl-ether | 7.5–15.5 | 31–62 | 15.5 |
| N-(3-pyridyl)-formimino-propylether | 7.5 | 15.5 | 15.5 |
| N-(4-pyridyl)-formimino-ethylether | 15.5–31 | 15.5 | 31–62 |
| N-(5-chloro-2-pyridyl)-formimino-ethylether | 7.5–15.5 | 15.5 | 15.5 |
| N-(3-chloro-2-pyridyl)-formimino-ethyl-ether | 15.5–31 | 31 | 15.5 |

Table II shows similar minimal inhibiting concentrations in mg. percent, compared with those of three well-known anthelmintic agents.

TABLE II

| Compound | Minimal inhibiting concentrations in mg. percent against— | |
|---|---|---|
|  | *Enchytraeus albidus* | *Tubifex rivulorum* |
| N-(4-pyridyl)-formimino-heptylether | 3.5–7.5 | 15.5–31 |
| N-(4-pyridyl)-formimino-decylether | 1.7–3.5 | 15.5 |
| N-(4-pyridyl)-formimino-cetylether | 15.5 | 15.5–31 |
| N-(4-pyridyl)-formimino-benzylether | 7.5 | 7.5 |
| N-(4-pyridyl)-formimino-phenylethyl-ether | 3.5–7.5 | 7.5 |
| N-(3-pyridyl)-formimino-cetylether | 15.5–31 | 3.5–7.5 |
| N-(3-pyridyl)-formimino-decylether | 1.7–0.8 | 1.7–0.8 |
| N-(3-pyridyl)-formimimo-cyclohexyl-ether | 15.5 | 1.7–0.8 |
| N-(2-pyridyl)-formimino-heptylether | 7.5–15.5 | 1.7–0.8 |
| N-(2-pyridyl)-formimino-phenylethyl-ether | 1.7–0.8 | 15.5–7.5 |
| N-(2-pyridyl)-formimino-cyclopentyl-ether | 15.5–31 | 15.5 |
| N-(2-pyridyl)-formimino-benzylether | 1.7–0.8 | 0.4–0.8 |
| N-(4-methyl-2-pyridyl)-formimino-(β-diethylaminoethyl)-ether | 15.5–31 | 15.5–7.5 |
| N-(5-chloro-2-pyridyl)-formimino-4′-heptylether | 15.5–7.5 | 7.5 |
| Known compounds for comparison: |  |  |
| 2′5-dichloro-4′-nitrosalicylanilide (Niclosamide) | 15.5–7.5 | 15.5–31 |
| 2-(β-methoxyethyl)-pyridine (Methyridine) | 7.5–3.5 | 15.5–31 |
| 1-[(2-diethylaminoethyl)-amino]-4-methylthioxanthen-9-one hydro-chloride (Lucanthone Hydrochloride) | 15.5–31 | 15.5–7.5 |

Having described our invention, we claim:
1. An N-pyridyl-formimino ether of the formula

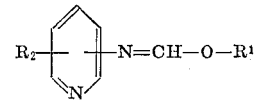

wherein R¹ is a member selected from the group consisting of straight or branched chain alkyl having 7–16 carbon atoms, cycloalkyl having 5–6 carbon atoms, benzyl, phenylethyl, dimethylaminoethyl and diethylaminoethyl, and R² is a member selected from the group consisting of hydrogen, halogen, nitro and lower alkyl.

References Cited

FOREIGN PATENTS 153,520  10/1966  Hungary _____ 260—296

HENRY R. JILES, Primary Examiner

S. D. WINTERS, Assistant Examiner

U.S. Cl. X.R.

260—296; 424—263, 244